United States Patent
Roy et al.

[11] Patent Number: 5,878,028
[45] Date of Patent: Mar. 2, 1999

[54] DATA STRUCTURE TO SUPPORT MULTIPLE TRANSMIT PACKETS FOR HIGH PERFORMANCE

[75] Inventors: Rajat Roy, Sunnyvale; Jeffrey Dwork, San Jose; Jenny Fischer, Mountain View, all of Calif.

[73] Assignee: Advanced Micro Devices, Inc., Sunnyvale, Calif.

[21] Appl. No.: 659,733

[22] Filed: Jun. 6, 1996

[51] Int. Cl.[6] ................................................ H04L 29/06
[52] U.S. Cl. .................... 370/235; 370/429; 370/463; 395/200.8
[58] Field of Search ................................. 370/470, 471, 370/472, 230, 235, 428, 429, 463; 395/200.43, 200.44, 200.5, 200.55, 200.8, 200.81

[56] References Cited

U.S. PATENT DOCUMENTS

| | | | |
|---|---|---|---|
| 5,461,618 | 10/1995 | Chen et al. | 370/471 |
| 5,481,735 | 1/1996 | Mortensen et al. | 370/472 |
| 5,485,579 | 1/1996 | Hitz et al. | 395/200.81 |
| 5,535,221 | 7/1996 | Hijikata et al. | 370/471 |
| 5,568,478 | 10/1996 | Van Loo, Jr. et al. | 370/471 |

FOREIGN PATENT DOCUMENTS

| | | | |
|---|---|---|---|
| 0 429 055 A2 | 11/1990 | European Pat. Off. | H04L 29/06 |
| 0 459 752 A2 | 5/1991 | European Pat. Off. | H04L 29/06 |
| 0 459 753 A2 | 5/1991 | European Pat. Off. | H04L 29/06 |

*Primary Examiner*—Chi H. Pham
*Assistant Examiner*—Ricky Q. Ngo
*Attorney, Agent, or Firm*—H. Donald Nelson

[57] ABSTRACT

A data structure to provide high performance in the transmit portion of an ethernet controller. The data structure includes the data to be transmitted, the STATUS information of the data to be transmitted, and the DESCRIPTOR information of the data to be transmitted. The data is organized in 8-bit bytes in 32-bit rows, the 32 bit STATUS information is organized in four 8-bit bytes in a 32 bit row, and the 32 bit DESCRIPTOR information is organized in four 8-bit bytes in a 32 bit row. A one-bit tag field is associated with each of the rows and a 1 in the tag field indicates that the end-of-packet is located in the row associated with that tag. The lower four bits of a STATUS byte contains information indicating which byte in the row contains the end-of-packet.

4 Claims, 4 Drawing Sheets

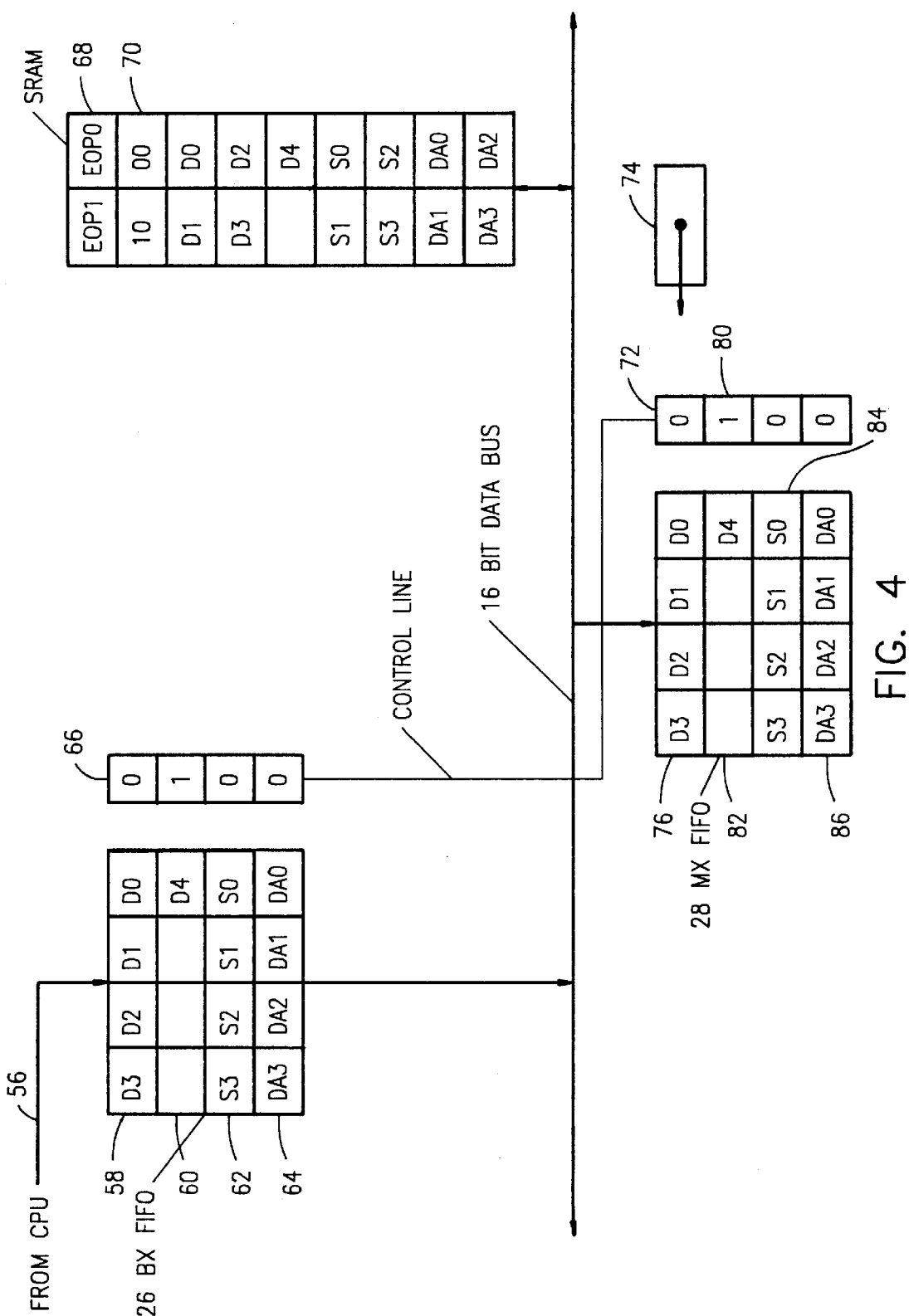

DATA STRUCTURE TO SUPPORT MULTIPLE TRANSMIT PACKETS FOR HIGH PERFORMANCE

BACKGROUND OF THE INVENTION

1. Field of the Invention

This invention relates generally to a method and device for controlling the transmission of information by a station to and from an ethernet and, more particularly, to a method and device for increasing the performance of the transmission of information and even more particularly, to a data structure to support multiple tranmsit packets for high performance.

2. Discussion of the Related Art

This invention is related to U.S. patent application Ser. No. 08/659,795 now U.S. Pat. No. 5,819,113 entitled "END OF PACKET DETECTION FOR STORING MULTIPLE PACKETS IN AN SRAM" invented by Alok Singh and Rajat Roy and U.S. patent application Ser. No. 08/669,728 now U.S. Pat. No. 5,818,844, entitled "ADDRESS GENERATION AND DATA PATH ARBITRATION TO AND FROM SRAM TO ACCOMMODATE MULTIPLE TRANSMITTED PACKETS" invented by Alok Singh, Rajat Roy, and Jerry Kuo, both applications assigned to the assignee of this application and both filed on the same date as this application.

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation.

The ISO Open Systems Interconnection Basic Reference Model defines a seven-layer model for data communications in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates how a prior art system 10 with a workstation, personal computer, file server, data terminal equipment, or other such information processing equipment, represented by CPU 12, is connected to an ethernet 22 or other types of data communications equipment represented by the media independent interface 24. In FIG. 1, ethernet controller 14, also commonly known as a Network Interface Controller, is situated between the CPU 12 and the incoming (and outgoing) ethernet 22 lines. Typically, the ethernet 22 connection consists of two pairs of twisted-pair copper cables, an incoming pair referred to as 10R and an outgoing pair referred to as 10T.

The ethernet controller 14 is responsible for controlling the transmission of outgoing data to the outgoing pair or cable and the reception of incoming data from the incoming pair or cable. For example, before being furnished to the outgoing pair or cable, the outgoing data is Manchester encoded to reduce electromagnetic interference. The Manchester encoding causes some portions of the data stream to be pulses at 10 MHz while other portions of the data stream are pulses at 5 MHz.

The ever growing need to transfer more information faster, accompanied by increases in data processing capability, is necessitating an expansion to data transfer rates considerably higher than the 10 Mbps rate prescribed by the 10Base-T protocol. As a consequence there is a 100Base-TX protocol which extends IEEE Standard 802.3 to accommodate data moving at an effective transfer rate of 100 Mbps through twisted-pair cables of presently existing systems. There are situations in which it is desirable that the physical transmission media be capable of handling data transferred through twisted-pair cables at both the 100Base-TX rate and the lower 10Base-T rate. Presently there is a need to support a PCI speed of 33 MHz on the internal PCI bus and a need to support an ethernet speed of 25 MHz maximum for the 100 MBits per second operation in order to support the full duplex mode of operation with an interpacket gap of 0.96 microseconds.

In addition to the problems associated with the transmission of data at different rates over the ethernet or the media independent interface, there are the problems associated with the varying data handling capabilities of the personal computers, workstations, file servers, repeaters, data terminal equipment, and other such information processing equipment. For example, in a personal computer system there may be other equipment or duties that the CPU 12 must attend to in addition to the receipt or transmission of data over the ethernet 22.

The ethernet controller 14 is responsible for controlling the transmission of data from the CPU 12 to the ethernet 22. One of the major problems confronted by the ethernet controller 14 is that the different memory devices in the various components are of differing sizes. For example, there is a requirement to keep semiconductor devices as small as possible. For that reason, it is advantageous to have bus sizes as small as possible without degrading performance of the device. As can be appreciated, a 16 bit bus is half the size of a 32 bit bus and if it is possible to provide the same performance with a 16 bit bus as a 32 bit bus it is preferable to design the part with a 16 bit bus. In addition, the smaller the bus size the less probability there will be manufacturing defects in the bus.

Referring to FIG. 2 the differing size components are illustrated. The SRAM 16 is a 16 bit memory device, data bus 20 is a 16 bit data bus, and the PCI BUS 18 is typically a 32 bit bus. There are presently 64 bit PCI Buses and future computer systems may all have the 64 bit PCI Bus as a standard bus size. The SRAM 16 is used as a buffer by ethernet controller 14 to prevent delays from occurring in the transmission of data either from the ethernet 22 to the CPU 12 or from the CPU 12 to the ethernet 22. Such delays could be caused, for example, by high latency in the CPU 12 or by a collision on the ethernet 22 causing a sending station to have to retransmit information that has just been sent. The various FIFOS, BX FIFO 26, MX FIFO 28, BR FIFO 30, and MR FIFO 32 are responsible for controlling the transmission of data between the various components. For example, BX FIFO 26 is responsible for receiving data from CPU 12 via PCI BUS 18, changing the format from 32 bits to 16 bits so that it can be transmitted over the 16 bit data bus 20 to SRAM 16. In addition, there is a requirement for addresses to be generated by BX FIFO 26 and MR FIFO 32 so that the information can be placed into SRAM 16 and retrieved efficiently by MX FIFO 28 and BR FIFO 30 respectively, which are responsible for changing the format from 16 bits as received from SRAM 16 into a 32 bit format.

In addition, because there is the possibility that there will be a need to receive data at the same time that there will be need to send data via ethernet 22 and also that there will be a need for the ethernet controller 14 to receive data from CPU 12 at the same time that there will be a need to send data to the CPU 12 there is a necessity for ethernet controller 14 to make intelligent choices for which data will be sent or received first and in what sequence subsequent data will be sent or received.

Because the data from the CPU 12 is being sent to the ethernet 22 there is a requirement to maintain and update the status of the data that is being sent. There are error codes and conditions that indicate whether the data has been successfully sent, has been garbled, has not been successfully sent, etc.

What is needed is an efficient and effective data structure that can be "piggy backed" to the packet for the maintenance and updating of the status of the packet.

SUMMARY OF THE INVENTION

In accordance with the present invention, a data structure is described that provides high performance in the transmit portion of an ethernet controller. The data structure includes the data to be transmitted, the STATUS information of the data to be transmitted, and the DESCRIPTOR information of the data to be transmitted.

The data to be transmitted is organized in 8-bit bytes in 32-bit rows, the 32 bit STATUS information is organized in four 8-bit bytes in a 32 bit row, and the 32 bit DESCRIPTOR information is organized in four 8-bit bytes in a 32 bit row.

A one-bit tag field is associated with each row and a 1 in the tag field indicates that the end-of-packet is located in the row associated with that tag. The lower four bits of a STATUS byte contains information indicating which byte in the row contains the end-of-packet.

The present invention is better understood upon consideration of the detailed description below, in conjunction with the accompanying drawings. As will become readily apparent to those skilled in this art from the following description there is shown and described a preferred embodiment of this invention simply by way of illustration of the mode best suited to carry out the invention. As it will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings:

FIG. 4 illustrates the data structure of the present invention.

DETAILED DESCRIPTION

Figure 1:
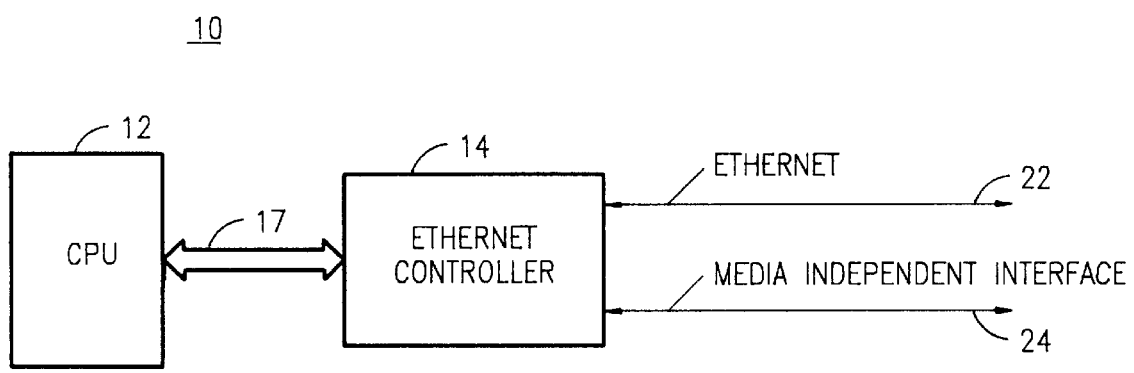
FIG. 1 shows an overall view of a prior art system with an ethernet controller, a CPU, an ethernet connection and a media independent interface connection.

Referring now to FIG. 1 there is shown an overview of a prior art system 10 with a CPU 12 and an ethernet controller 14 with connections to an ethernet 22 and a media independent interface 24. The CPU 12 is connected to the ethernet controller 14 by BUS 17.

Figure 2:
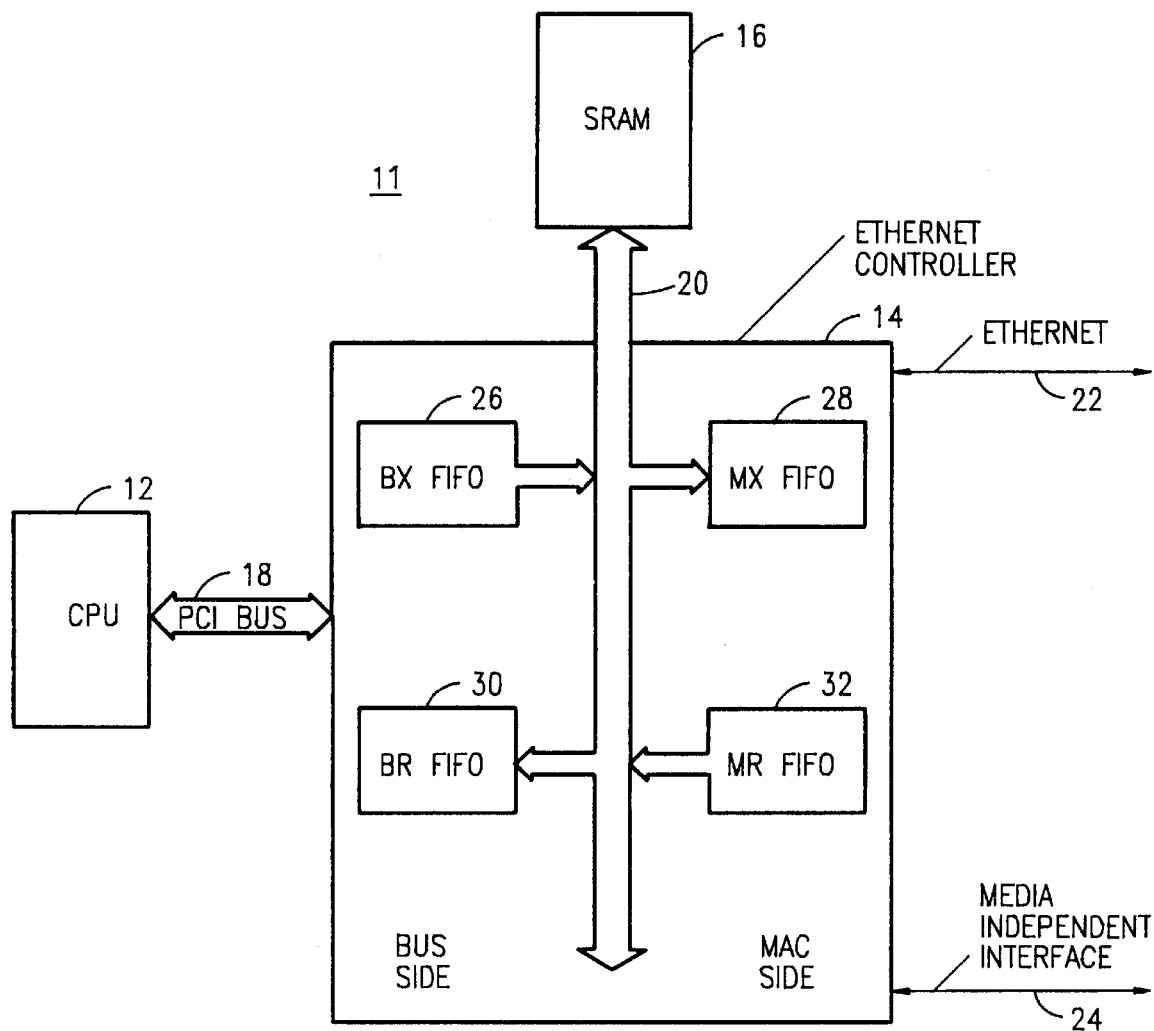
FIG. 2 shows an overall view of a system of the present invention.

Referring now to FIG. 2, there is shown a system 11 as taught by the present invention. In this and subsequent figures like numerals will be used to denote like components. A portion of the ethernet controller 14 is shown in FIG. 2. It is to be understood that the ethernet controller 14 has many other functions than the functions as taught by the present invention and only those components that are pertinent to the present invention are discussed.

The function of the illustrated portion of the ethernet controller 14 is to manage the transmission of data to and from the ethernet 22 and/or the media independent interface 24. The ethernet controller 14 manages the transmission of data by utilizing SRAM 16 as a buffer to prevent the slowing down of the transmission of data to and from either the CPU 12 or the ethernet 22 or the media independent interface 24. There are various reasons that the transmission of data can be slowed down, for example, the latency of CPU 12 can be high and the transmission of data from the ethernet 22 could be stopped until CPU 12 is freed from other interrupts. Conversely, the CPU 12 could be attempting to send data via the ethernet 22 and the ethernet 22 could be busy which would cause the data from the CPU 12 to be stopped or held until the ethernet 22 is free.

To avoid problems caused by not being able to complete the sending or the receiving of information, the ethernet controller 14 has four FIFOs, each with a selected size to maximize the performance of the ethernet controller 14. BX FIFO 26 is a 180 Byte FIFO, MX FIFO 28 is a 112 Byte FIFO, BR FIFO 30 is a 160 Byte FIFO, and MR FIFO 32 is a 108 Byte FIFO. The BX FIFO 26 and the BR FIFO 30 are on the BUS side of ethernet controller 14 and MX FIFO 28 and MR FIFO 32 are on the MAC (Media Access Control) side of the ethernet controller 14. Each of the FIFOs manages either an input or output function. The BX FIFO 26 manages the transmission of data from CPU 12 to SRAM 16. MX FIFO 28 manages the transmission of data from SRAM 16 to the ethernet 22 or the media independent interface 24. Similarly, MR FIFO 32 manages the transmission of data from either the ethernet 22 or the media independent interface 24.

Figure 3:
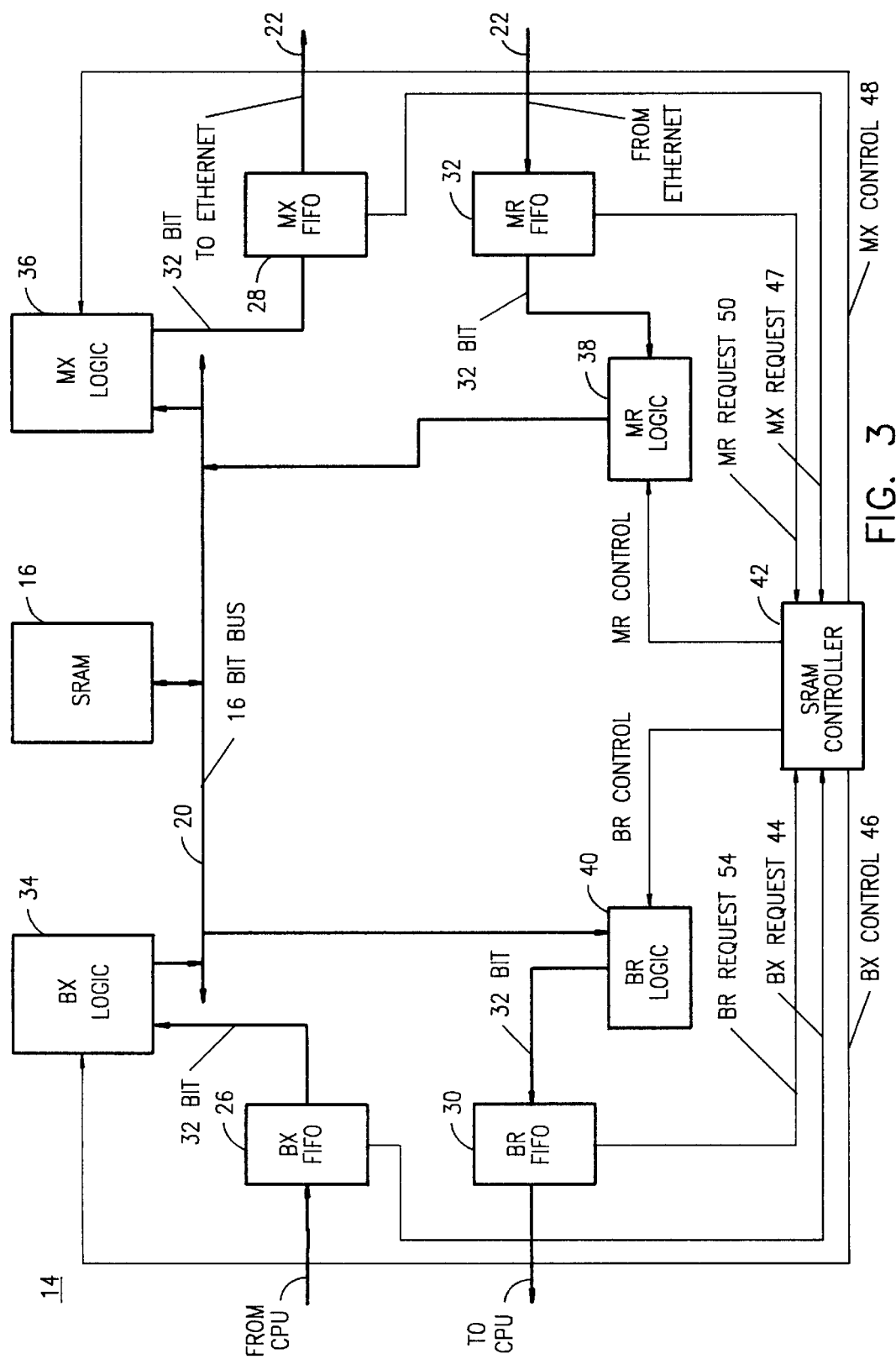
FIG. 3 shows the ethernet controller of the present invention.

Referring now to FIG. 3, the ethernet controller 14 is shown in more detail. Each of the four FIFOs discussed in conjunction with FIG. 2 includes or is associated with a logic block. BX FIFO 26 is associated with BX LOGIC 34 which generates addresses for SRAM 16 and prepares 32 bit data from the CPU to be transmitted over the 16 bit data path 20 to SRAM 16, MX FIFO 28 is associated with MX LOGIC 36 which generates addresses for the 16 bit data to be retrieved from SRAM 16, reads the 16 bit data in SRAM 16, converts the 16 bit data retrieved from SRAM 16 to 32 bits, and writes the 32 bit data to MX FIFO 28. MR FIFO 32 is associated with MR LOGIC 38 which converts data received by MR FIFO 32 from ethernet 22 to a 16 bit size and generates addresses for the 16 bit data which is to be written in SRAM 16, and BR FIFO 30 is associated with BR LOGIC 40 which reads data in SRAM 16 that had been received from ethernet 22, changes the data from 16 bit size to 32 bit size and writes the 32 bit size data in BR FIFO 30 from which it will be sent to the CPU 12.

SRAM CONTROLLER 42 controls the four FIFOs and in cases of conflict, that is, when more than one FIFO requests the bus to transmit data, the SRAM CONTROLLER 42 arbitrates according to a predetermined algorithm which determines which FIFO will have priority and in which order. The algorithm is discussed below.

The overall operation of the system shown in FIG. 3 is as follows. The ethernet controller 14 is responsible for the overall operation of the transmission of data from the CPU 12 to the ethernet 22 and for the transmission of data from the ethernet 22 to the CPU 12. As discussed above, one of the major problems with the transmission of data to and from the ethernet 22 is that there are various factors that can affect the efficient transmission of any such data. One factor is the different speeds that must be accommodated. The PCI BUS 18 operates at a speed of 33 MHz and the ethernet 22 operates at a maximum speed of 25 MHz for the 100 Mbit operation which supports full duplex operation with an interpacket gap of 0.96 microseconds. One of the major functions of ethernet controller 14 is to manage the transfer of data between the various components in such a way as to minimize any delay in either receiving or transmitting such data. For example, when CPU 12 (not shown) wishes to send data to the ethernet 22 it communicates with, and sends data to BX FIFO 26. BX FIFO 26 requests access to the bus from SRAM CONTROLLER 42 via BX REQUEST LINE 44. When BX LOGIC 34 receives a grant from SRAM CONTROLLER 42 via BX CONTROL LINE 46, BX LOGIC 34 changes the 32 bit size data received from the CPU 12 to 16 bit size data and generates addresses for the SRAM 16 for the storage of the data in 16 bit format. The converted data is communicated to and written in SRAM 16 via the 16 bit bus 20. BX LOGIC 34 is a state machine which controls the flow of data from BX FIFO 26 to SRAM 16 and will operate once it gets a grant signal from SRAM CONTROLLER 42. Because BX FIFO 26 is 32 bits wide and the data bus 20 is 16 bits wide, it will take BX LOGIC 34 two cycles to write the 16 bit size data to SRAM 16 as it can only write 16 bits on a 16 bit size data bus in each cycle. It has been determined that the transfer of data via BX FIFO 26 is maximized, that is, any delay in the transfer of data via BX FIFO 26 is minimized by having the size of BX FIFO 26 at 180 Bytes. As will be discussed below, SRAM CONTROLLER 42 manages the receiving and transmitting of data through all FIFOs including BX FIFO 26 in accordance with an arbitration algorithm that maximizes the performance of the system 11.

The size of SRAM 16 is selectable and in this embodiment has been selected to be 64K Bytes, however, it is expandable to at least 128K Bytes. Therefore, it is necessary to have 16 bits of address to access each memory location. However, the ethernet controller 14 has only 8 bits of address ports to save space and to be more cost effective. For this reason, a 16 bit address must be divided into an upper 8 bit portion and a lower 8 bit portion, transmitted via an 8 bit address bus, and reassembled outside the ethernet controller 14 into a 16 bit address. The details of the address generation and transmission are discussed in co-pending U.S. patent application Ser. No. 08/669,728 in conjunction with FIGS. 6 & 7.

The ethernet controller 14 is in constant communication with the ethernet network via MX FIFO 28 and depending upon what type of protocol is used, the system determines when data can be sent via ethernet 22. When data can be sent via ethernet 22, MX FIFO 28 requests access to the data bus 20 via MX REQUEST LINE 47 from SRAM CONTROLLER 42. When access is granted and communicated via MX CONTROL LINE 48 to MX LOGIC 36 the data which has been either temporarily written in SRAM 16 or is in MX FIFO 28, which will be or has been converted into the original 32 bit form as received from the CPU 12 by BX FIFO 26, will be transmitted by MX FIFO 28 via ethernet 22. MX FIFO 28 is a state machine that controls the flow of data from SRAM 16 to MX FIFO 28 and operates when it gets a grant signal from SRAM CONTROLLER 42. The MX FIFO 28 is 32 bits wide and the data bus 20 is 16 bits wide, therefore, after MX LOGIC 36 has read 16 bits of data twice and using logic to assemble them in a double word (32 bits) a write signal is given to MX FIFO 28. This means that a write to MX FIFO 28 is given every alternate cycle and a read from SRAM 16 is done every cycle. MX FIFO 28 controls the read from SRAM 16 and the write to MX FIFO 28.

When MR FIFO 32 senses that there is information from the ethernet to be received, MR FIFO 32 requests access from SRAM CONTROLLER 42 to the data bus 20 via MR REQUEST LINE 50. When SRAM CONTROLLER 42 grants access via MR CONTROL LINE 52 the data received by MR FIFO 32 is converted to 16 bit format by MR LOGIC 38 and sent to SRAM 16 via the 16 bit data bus 20. The operation of the MR LOGIC 38 is similar to the operation of the BX LOGIC 34 discussed above.

When the CPU is ready to receive the data received from the ethernet, BR FIFO 38 requests access from SRAM CONTROLLER 42 to the data bus 20 via BR REQUEST LINE 54. When access is granted, SRAM CONTROLLER 42 communicates to BR LOGIC 40 which reads the data from SRAM 16, converts the data which has been stored in 16 bit data format to a 32 bit data format, and forwards the data to BR FIFO 30, which, in turn, sends the data to the CPU. The operation of BR LOGIC 40 is similar to the operation of MX LOGIC 36 discussed above.

Referring now to FIG. 4 there is illustrated the data structure of the present invention and how it is utilized to provide high performance in the ethernet controller 14 (FIG. 3). The following explanation will describe a packet containing 5 bytes of data, D0 through D4, and each byte is 8 bits. The 5 bytes of data are received from memory as directed by the CPU 12 as indicated at 56. The BX FIFO 26 is 32 bits wide and the 5 bytes of data are placed as shown in FIG. 4. The first four bytes, D through D4, are placed in a row of BX FIFO 26 indicated at 58. The last byte D4 is placed by itself in the lower 8 bits of the 32 bit row indicated at 60 in BX FIFO 26. The row immediately following the row that contains at least one byte of data, indicated at 62, contains four bytes of STATUS information, S0 through S3, that must be maintained and updated by the system to indicate whether the data has been successfully transmitted over the ethernet. The row immediately following the row that contains the STATUS information, indicated at 64, contains four bytes of DESCRIPTOR information, DA0 through DA3, which contains the address of the DESCRIPTOR memory where the status of the transmitted packet needs to be updated for the upper level protocol. As can be appreciated, the data structure of the present invention has all of the STATUS information and the DESCRIPTOR information concerning the packet of data to be transmitted "piggy backed" with the data thus negating any requirement of the system to provide separate memory locations for the storage of the STATUS and DESCRIPTOR information.

Associated with each row of memory in BX FIFO 26 is a one bit tag field, indicated at 66, that will be discussed below. As discribed above, the data, including the STATUS and DESCRIPTOR information is written to SRAM 16 and written into the 16 bit memory as indicated. In addition, to the 5 bytes of data, D0 through D4, there is a first row of memory in SRAM 16, indicated at 68, reserved for end-of-packet (EOP) information. The end-of-packet information placed in the first reserved row 68 is the 16 bit address of the location in SRAM 16 in which the last byte of the packet is written, and in this case, the memory location in which byte D4 is written would be written into row 68. The next row, indicated at 70, is reserved for a valid bit, which indicates to the system if the end-of-packet has been written into memory. Because SRAM 16 is a 16 bit memory, the 32 bit data, STATUS and DESCRIPTOR information is reformatted into a 16 bit format before being written into SRAM 16.

As described above, the data, STATUS and DESCRIPTOR information is written into MX FIFO 28 and is written as shown in FIG. 4. In addition, the information in the tag field 66 associated with BX FIFO 26 is communicated to a tag field, indicated at 72, associated with MX FIFO 28. As the MX FIFO 28 is being read, indicated by a read pointer 74, the contents of the tag field 72 are read. The contents of the tag field indicate the following: a zero in the tag field indicates that the end-of-packet has not been reached, that is, that the row in MX FIFO 28 currently being read does not contain the last byte of the packet and a one in the tag field indicates that the end-of-packet is contained in the row being read. For example, when the pointer 74 is pointing to row 76 the zero indicates that the end-of-packet is not in row 76. When the pointer 74 is pointing to row 82 the tag field 72 at 80 will have a one written into it. The one in 80 indicates that the end-of-packet is in row 82.

In addition to indicating that the end-of-packet is contained in the row being read, the tag indicates to the system that the lower 4 bits in the first STATUS byte S0, indicated at 84, indicates which byte of the four bytes in the row contains the end-of-packet. For example, in this case, since the end-of-packet byte is located in the lowest byte in row 82 the lower 4 bits in the first STATUS byte S0 84 will read 0001. As described above, the remaining STATUS information concerns the status of the data, that is, whether the data was successfully sent via the ethernet. Also, as described above, the following row 86 contains 4 bytes of DESCRIPTOR information concerning the location in DESCRIPTOR memory where the status of the transmitted packet needs to be updated for the upper level protocol.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications which are suited to the particular use contemplated. All such modifications and variations are within the scope of the invention as determined by the appended claims when interpreted in accordance with the breadth to which they are fairly, legally, and equitably entitled.

What we claim is:

1. An ethernet controller for controlling the transmission of data from a CPU to an ethernet and from the ethernet to the CPU, comprising:

a first FIFO with rows each having a width of 32 bits, wherein the first FIFO receives a packet of data to be transmitted to the ethernet from the CPU via a 32 bit bus;

a first LOGIC element associated with the first FIFO wherein the first LOGIC element places the packet of data to be transmitted to the ethernet received from the CPU into the first FIFO by rows in an 8 bit byte format;

a tag bit associated with each row in the first FIFO wherein the tag bit indicates in which row the end of the packet is placed;

wherein the first LOGIC element places 32 bits of status information into the first FIFO in a row immediately following the row in which the end of packet is placed;

wherein the first LOGIC element places 32 bits of descriptor information into the first FIFO in a row immediately following the row in which the 32 bits of status information is placed, wherein the status information and descriptor information is piggybacked onto the data to be transmitted to the ethernet;

an SRAM having a width of 16 bits;

wherein the first LOGIC element converts the 32 bit information in the first FIFO to 16 bit information and generates addresses to place the data to be transmitted to the ethernet and the piggybacked information into the SRAM;

wherein the converted 32 bit data to be transmitted to the ethernet and the piggybacked information is written into the SRAM via a 16 bit bus.

2. The ethernet controller of claim 1 wherein the ethernet controller further comprises:

a second FIFO with rows each having a width of 32 bits, wherein the second FIFO receives the packet of data to be transmitted to the ethernet and the piggybacked information from the SRAM via a 16 bit bus;

a second LOGIC element associated with the second FIFO wherein the second LOGIC element converts the 16 bit information received via the 16 bit bus into 32 bit information and places the packet of data to be transmitted to the ethernet and the piggybacked information from the SRAM into the second FIFO by rows in an 8 bit byte format;

a tag bit associated with each row in the second FIFO wherein the tag bit indicates in which row the end of the packet of data to be transmitted to the ethernet is placed; and wherein the packet of data to be transmitted to the ethernet is transmitted to the ethernet.

3. The ethernet controller of claim 2 wherein the ethernet controller further comprises:

a third FIFO with rows each having a width of 32 bits, wherein the third FIFO receives a packet of data to be transmitted to the CPU from the ethernet in a 32 bit format;

a third LOGIC element associated with the third FIFO wherein the third LOGIC element places the packet of data to be transmitted to the CPU received from the ethernet into the third FIFO by rows in an 8 bit byte format;

a tag bit associated with each row in the third FIFO wherein the tag bit indicates in which row the end of the packet is placed;

wherein the third LOGIC element places 32 bits of status information into the third FIFO in a row immediately following the row in which the end of packet is placed;

wherein the third LOGIC element places 32 bits of descriptor information into the third FIFO in a row immediately following the row in which the status information is placed, wherein the status information and descriptor information is piggybacked onto the data to be transmitted to the CPU;

wherein the third LOGIC element converts the 32 bit information in the third FIFO to 16 bit information and generates addresses to place the data to be transmitted to the CPU and the piggybacked information into the SRAM;

wherein the converted 32 bit data to be transmitted to the CPU and the piggybacked information is written into the SRAM via a 16 bit bus.

4. The ethernet controller of claim 3 wherein the ethernet controller further comprises:

a fourth FIFO with rows each having a width of 32 bits, wherein the fourth FIFO receives the packet of data to be transmitted to the CPU and the piggybacked information from the SRAM via a 16 bit bus;

a fourth LOGIC element associated with the fourth FIFO wherein the fourth LOGIC element converts the 16 bit information received from the SRAM into 32 bit information and places the packet of data to be transmitted to the CPU and the piggybacked information from the SRAM into the fourth FIFO by rows in an 8 bit format;

a tag bit associated with each row in the fourth FIFO wherein the tag bit indicates in which row the end of the packet of data to be transmitted to the CPU is placed; and wherein the packet of data to be transmitted to the CPU is transmitted to the CPU via a 32 bit bus.

* * * * *